United States Patent Office.

WILLIAM C. KIPLING AND EDWARD ARNOLD, OF SUDBURY, ENGLAND; SAID KIPLING ASSIGNOR TO GEORGE LANCELOT ANDREWES, OF SAME PLACE.

COMPOSITION FOR WATERPROOFING.

SPECIFICATION forming part of Letters Patent No. 644,250, dated February 27, 1900.

Application filed November 8, 1897. Serial No. 657,873. (No specimens.)

*To all whom it may concern:*

Be it known that we, WILLIAM CHARLES KIPLING, residing at Great Cornard, Sudbury, and EDWARD ARNOLD, residing at Sudbury, county of Suffolk, England, subjects of the Queen of Great Britain and Ireland, have invented certain new and useful Improvements in Composition for Waterproofing Silk, Cotton, Wool, or other Fibrous Substances or Fabrics, (for which we have obtained Letters Patent as follows: Great Britain, No. 22,197, of 1896; Belgium, No. 127,579, dated April 13, 1897; Austria, No. 47/2,061, dated May 30, 1897, and Italy, No. XXXIII, 44,434, LXXXVIII, 51, dated June 30, 1897,) of which the following is a specification.

This invention relates to improvements in and relating to waterproofing after dyeing threads of silk, wool, flax, cotton, and other fibrous substances used in forming fabrics.

In carrying out our invention we waterproof threads which have passed through the hands of the dyer, and the ingredients which we employ for waterproofing are sulfate of alumina and acetate of lead, each made separately into solution in distilled water and then mixed so as to form in their proper proportions a pure solution of acetate of alumina. A solution of tannic acid is added to the previous solution after precipitation has taken place, and after the further precipitation the resulting clear solution gives our waterproofing compound. Care is to be taken that this tannic acid is of very good quality and should be the crystallized body.

One chemical formula which we have found to answer well in practice is a mixture of three ounces of sulfate of alumina, four ounces of acetate of lead, one-fourth ounce of tannin, and one gallon of distilled water. The sulfate of alumina is found to be somewhat in excess of the quantity required to form acetate of alumina when mixed in solution with the acetate of lead; but in treating different materials the proportions in this chemical formula need not be very closely adhered to, as we have found that especially in treating silk threads the proportions five ounces of sulfate of alumina, four ounces of acetate of lead, one-fourth ounce of tannin, and one gallon of distilled water give a good result. We consider that an excess of sulfate of alumina beyond that necessary to form the acetate of alumina, to a greater amount than that last above stated, is unnecessary. The threads are dipped in the compound formed as we have directed, the amount of dipping varying according to the character of the material under treatment, and are then allowed to dry.

We are aware that it is not new to employ acetate or other salts of alumina for the purposes of waterproofing threads and fabrics, but goods so treated do not present the advantages we show as a result of our treatment. We find that the presence of tannin in the final solution improves, fixes, and renders permanent the waterproofing, while at the same time it shrinks and strengthens the threads.

The admixture of tannin with acetate of alumina causes aluminium tannate to be precipitated and also causes a quantity of acetic acid to be set free. This free acetic acid prevents the complete combination of the alumina with the tannic acid and a state of equilibrium is produced, the resultant compound having a quantity of tannic acid in solution, and it is this tannic acid, together with the acetate of alumina, which enables the beneficial results herein referred to to be attained.

Our method of waterproofing makes the colors fast or permanent, especially when dealing with delicate hues, and the "feel" and "finish" of the fabrics, more especially silk fabrics, are considerably improved. A fabric when woven up of threads which have been waterproofed by such compound is thoroughly waterproof, free from odor, and the waterproofing is not noticeable.

Fabric which is already formed may be treated by our improved compound in the same manner as threads before weaving, the amount of dipping being regulated by the thickness and character of the material, with advantageous results, and we may point out a special advantage in the use of such compound in respect that a substantial shrinkage takes place while the fabrics are being waterproofed, thus obviating in some cases the necessity of special treatment for shrinking.

Having now described our invention, what we claim as new, and desire to secure by Letters Patent, is—

1. A wash for rendering silk, cotton or other material waterproof, containing tannate of alumina, substantially as described.

2. A composition of matter for waterproofing silk, cotton or other material, composed of tannic acid and acetate of alumina, substantially as described.

3. A composition of matter for waterproofing silk, cotton or other material, composed of sulfate of alumina, acetate of lead, tannic acid and distilled water, substantially as described.

4. A composition of matter for waterproofing silk, cotton or other material, composed of the following ingredients in substantially the proportions named: sulfate of alumina, three to five ounces; acetate of lead, four ounces; tannic acid, one-fourth ounce; distilled water, one gallon.

In witness whereof we have hereunto set our hands in presence of two witnesses.

WM. C. KIPLING.
EDWARD ARNOLD.

Witnesses:
EDWARD POMEROY,
A. E. WILLIAMS.